United States Patent
Wright et al.

(10) Patent No.: US 10,077,377 B2
(45) Date of Patent: Sep. 18, 2018

(54) COATING METHOD FOR SURFACES IN CHEMICAL INSTALLATIONS

(71) Applicant: Akzo Nobel Coatings International B.V., Arnhem (NL)

(72) Inventors: Anthony Colin Wright, Newcastle-upon-tyne (GB); Matthew George Unthank, Whitley Bay (GB); Colin Cameron, Stocksfield (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/306,022

(22) PCT Filed: Apr. 24, 2015

(86) PCT No.: PCT/EP2015/058868
§ 371 (c)(1),
(2) Date: Oct. 21, 2016

(87) PCT Pub. No.: WO2015/165808
PCT Pub. Date: Nov. 5, 2015

(65) Prior Publication Data
US 2017/0044396 A1    Feb. 16, 2017

(30) Foreign Application Priority Data

Apr. 29, 2014 (EP) .................... 14166421

(51) Int. Cl.

| C09D 163/04 | (2006.01) |
|---|---|
| C09D 5/08 | (2006.01) |
| C09D 163/00 | (2006.01) |
| B05D 3/00 | (2006.01) |
| C04B 41/00 | (2006.01) |
| C04B 41/48 | (2006.01) |

(52) U.S. Cl.
CPC .......... C09D 163/04 (2013.01); B05D 3/007 (2013.01); C04B 41/009 (2013.01); C04B 41/4853 (2013.01); C09D 5/082 (2013.01); C09D 5/086 (2013.01); C09D 163/00 (2013.01)

(58) Field of Classification Search
CPC .................. C09D 163/00; C08K 5/55
See application file for complete search history.

(56) References Cited

U.S. PATENT DOCUMENTS

| 3,446,756 A * | 5/1969 | Ramos ............... C08G 59/5033 |
| | | 523/122 |
| 5,137,990 A * | 8/1992 | Corley ................. C08F 283/10 |
| | | 525/502 |
| 2014/0107313 A1 | 4/2014 | Burckhardt et al. |

FOREIGN PATENT DOCUMENTS

| EP | 0 458 502 A2 | 11/1991 |
| IN | 193168 | 7/2009 |
| JP | 03-275773 A | 12/1991 |
| JP | 2002-338787 A | 11/2002 |
| WO | 03/011984 A2 | 2/2003 |
| WO | 12/067270 A1 | 5/2012 |
| WO | 12/151171 A2 | 11/2012 |

OTHER PUBLICATIONS

JP 2002 338787 Machine translation (2002).*

* cited by examiner

*Primary Examiner* — Kuo Liang Peng
(74) *Attorney, Agent, or Firm* — McDonnell Boehnen Hulbert & Berghoff LLP

(57) ABSTRACT

The invention pertains to a method for providing a metallic or concrete surface of a chemical installation with a coating, which comprises the steps of—providing a two-pack coating composition wherein the first pack comprises an epoxy resin and the second pack comprises an amine curing agent for the epoxy resin, the coating composition further comprising an organoboron compound of the formula $BX_1X_2X_3$, wherein $X_1$, $X_2$, and $X_3$ are independently selected from —Y1 and —OY2, wherein Y1 is independently selected from monovalent C1-C12 alkyl groups and monovalent C6-C12 aryl groups, and Y2 is independently selected from monovalent C1-C12 alkyl groups and monovalent C6-C12 aryl groups, and wherein at least one of $X_1$, $X_2$, and $X_3$ is an —OY2 group,—combining the first pack and the second pack to form a coating composition,—applying the coating composition to the surface of a chemical installation to form a coating layer, and—allowing the coating layer to cure at a temperature in the range of 0 to 50° C. A chemical installation provided with a lining of a cured coating composition as specified above, and a suitable coating composition, are also claimed. It has been found that the coating composition as specified herein has a wide application spectrum, and a high chemical resistance.

9 Claims, No Drawings

COATING METHOD FOR SURFACES IN CHEMICAL INSTALLATIONS

This application is the US national phase of PCT/EP2015/058868, filed Apr. 24, 2015, which claims the benefit of priority to EP 14166421.9, filed Apr. 29, 2014.

The present invention relates to a method for providing a metallic or concrete surface of a chemical installation with a coating. The invention also relates to compositions suitable for use as coating for metallic or concrete surfaces in chemical installations, and to the chemical installations provided with said coating.

In chemical installations, metallic and concrete surfaces come into contact with a wide variety of chemical compounds. These surfaces are generally provided with a coating, which serves two purposes. In the first place, the coating is intended to protect the surface from the chemical at issue. In the second place, the coating is to protect the chemical from contamination by the surface of the installation (e.g. a tank), e.g., by corrosion. To be broadly applicable, a coating used in this application should be able to handle interaction with a broad spectrum of chemical compounds. Additionally, the coating should be able to handle conditions of elevated temperature and pressure.

An additional issue occurs for surfaces which sequentially come into contact with more than one type of chemical. This is the case, e.g., for storage or transport tanks, which are used to store or transport liquid bulk chemicals, on land or by sea. A key feature for coatings which come into contact with different types of chemicals is the interaction with the various chemicals, where the aim is to avoid contamination of subsequent chemicals. Therefore, on the one hand, absorption can occur of the bulk chemicals in contact with the surface, and this absorption should be minimized. On the other hand, if chemicals are absorbed by the coating, they should easily be removed by conventional washing processes. This can be described as the coating having a high chemical resistance, wherein the term chemical resistance refers to the propensity of the coating to absorb and subsequently desorb a chemical, whilst maintaining film integrity.

WO2012/119968 describes a coating composition comprising a mixture of epoxy resins, a curing agent, an accelerator or a mixture of accelerators, and one or more fillers or pigments, wherein the mixture of epoxy resins comprises 60-80 wt. % of an RDGE epoxy resin and 20-40 wt. % of an epoxy novolac resin. The coating composition is described as a tank lining composition.

While the coating composition described in this reference shows good properties when used as a tank lining coating, there is still need for alternative coating compositions suitable for providing a coating onto a metallic or concrete surface of a chemical installation, which has a wide application spectrum and a high chemical resistance.

The present invention provides such a coating composition. The present invention also provides a method for providing concrete or metallic surface of a chemical installation with a cured coating layer, and to a surface provided with such a layer.

SUMMARY OF THE INVENTION

In one embodiment, the present invention pertains to a method for providing a metallic or concrete surface of a chemical installation with a coating, which comprises the steps of providing a two-pack coating composition wherein the first pack comprises an epoxy resin and the second pack comprises an amine curing agent for the epoxy resin, the coating composition further comprising an organoboron compound of the formula $BX1X2X3$, wherein $X1$, $X2$, and $X3$ are independently selected from $-Y1$ and $-OY2$, wherein $Y1$ is independently selected from monovalent C1-C12 alkyl groups and monovalent C6-C12 aryl groups, and $Y2$ is independently selected from monovalent C1-C12 alkyl groups and monovalent C6-C12 aryl groups, and wherein at least one of $X1$, $X2$, and $X3$ is an $-OY2$ group, combining the first pack and the second pack to form a coating composition, applying the coating composition to the surface of a chemical installation to form a coating layer, and allowing the coating layer to cure at a temperature in the range of 0 to 50° C.

In another embodiment, the present invention pertains to a chemical installation comprising a metallic or concrete surface provided with a lining of a cured coating composition, wherein the coating composition is derived from a coating composition comprising epoxy resin and amine curing agent for the epoxy resin, the coating composition further comprising an organoboron compound of the formula $BX1X2X3$, wherein $X1$, $X2$, and $X3$ are independently selected from $-Y1$ and $-OY2$, wherein $Y1$ is independently selected from monovalent C1-C12 alkyl groups and monovalent C6-C12 aryl groups, and $Y2$ is independently selected from monovalent C1-C12 alkyl groups and monovalent C6-C12 aryl groups, and wherein at least one of $X1$, $X2$, and $X3$ is an $-OY2$ group.

In a further embodiment, the present invention pertains to a coating composition suitable for providing a metallic or concrete surface of a chemical installation with a coating, wherein the coating composition is a two-pack coating composition wherein the first pack comprises an epoxy resin and the second pack comprises an amine curing agent for the epoxy resin, the coating composition further comprising an organoboron compound of the formula $BX1X2X3$, wherein $X1$, $X2$, and $X3$ are independently selected from $-Y1$ and $-OY2$, wherein $Y1$ is independently selected from monovalent C1-C12 alkyl groups and monovalent C6-C12 aryl groups, and $Y2$ is independently selected from monovalent C1-C12 alkyl groups and monovalent C6-C12 aryl groups, and wherein at least one of $X1$, $X2$, and $X3$ is an $-OY2$ group.

It has been found that the coating composition according to the present invention shows particularly good results in the coating of metal and concrete surfaces in chemical installations, in particular chimneys, pipes, and tanks such as storage tanks and cargo tanks.

Further advantages of the invention and specific embodiments thereof will become apparent from the further specification.

DETAILED DESCRIPTION

The coating composition used in the present invention comprises an organoboron compound of the formula $BX1X2X3$, wherein $X1$, $X2$, and $X3$ are independently selected from $-Y1$ and $-OY2$, wherein $Y1$ is independently selected from monovalent C1-C12 alkyl groups and monovalent C6-C12 aryl groups, and $Y2$ is independently selected from monovalent C1-C12 alkyl groups and monovalent C6-C12 aryl groups, and wherein at least one of $X1$, $X2$, and $X3$ is an $-OY2$ group.

The term alkyl includes straight-chain and branched alkyl groups and also encompasses cycloakyl groups. The term aryl also encompasses alkyl-substituted aryl groups, and aryl-substituted alkyl groups. The alkyl or aryl groups Y1 and Y2 may be also be substituted with groups containing oxygen atoms, nitrogen atoms, sulphur atoms, or phosphorus atoms, but this is not preferred.

In one embodiment Y1 and/or Y2 are independently selected from C1-C8 alkyl groups and C6-C8 aryl groups. In particular, Y1 and Y2 are both independently selected from C1-C8 alkyl groups and C6-C8 aryl groups.

In one embodiment Y1 and/or Y2 are independently selected from C2-C5 alkyl groups. In particular, Y1 and Y2 are both independently selected from C2-C5 alkyl groups.

It may be preferred for at least two of X1, X2, and X3 to be independently selected —OY2 groups, in particular with the Y2 groups being independently selected from C1-C8 alkyl groups and C6-C8 aryl groups, more in particular C2-C5 alkyl groups.

It may be particularly preferred for all of X1, X2, and X3 to be independently selected —OY2 groups, in particular with the Y2 groups being independently selected from C1-C8 alkyl groups and C6-C8 aryl groups, more in particular C2-C5 alkyl groups. The use of organoboron compounds of the formula $B(OY2)_3$, wherein the Y2 groups are independently selected from C2-C5 alkyl groups is considered particularly preferred.

Examples of suitable compounds include triethylborate, trimethyl borate, triisopropyl borate, tributylborate, the diethylester of phenyl boronic acid and the diethylester of methylboronic acid. The use of triethylborate is considered particularly preferred.

As will be evident to the skilled person each Y1 and Y2 present in the composition can be selected independently, and can be the same or different as the other Y1 and Y2 groups present in the composition. Mixtures of organoboron compounds of the formula BX1X2X3 can also be used.

The amount of organoboron compound may be governed by the following considerations. When an amine group opens up an epoxy functional group, a hydroxyl group is produced which is disposed in a manner which is β to the nitrogen atom of the amine group. Not wishing to be bound by theory, it is believed that interaction between the 1,2-aminoalcohol group and the boron compound results in a reaction which surprisingly improves the chemical resistance of the coating composition. By 'chemical resistance' we mean the propensity of the coating to absorb and subsequently desorb a chemical, solvent or other liquid cargo, whilst maintaining film integrity.

The amount of organoboron compound provided to the coating composition therefore is related to the amount of 1,2-aminoalcohol groups formed from the reaction between the epoxy groups and the amine curing agent present in the composition. It is not necessary to provide a B—Y1 or B—OY2 group for every single alcohol group produced from the epoxy-amine reaction.

A suitable amount of organoboron compound can, in one embodiment, be calculated as follows:
when the equivalent ratio of active hydrogens in the curing agent(s) to the epoxy groups present in the composition is 1.00:1.00 or higher, the number of B—OY2 groups present in the composition preferably is equal to 5-80% of the number of epoxy groups present in the composition, more preferably 10-50%, most preferably 20-40%, and
when the equivalent ratio of active hydrogens in the curing agent(s) to the epoxy groups present in the composition is below 1.00:1.00, the number of B—OY2 groups present in the composition preferably is equal to 5-80% of the number of active hydrogens in the curing agent(s), preferably 10-50%, most preferably 20-40%.

Alternatively, in another embodiment, a suitable amount of organoboron compound can be calculated as follows:
when the equivalent ratio of active hydrogens in the curing agent(s) to the epoxy groups present in the composition is 1.00:1.00 or higher, the number of B—OY2 groups present in the composition preferably is equal to 15-50% of the number of epoxy groups present in the composition, more preferably 15-40%, and
when the equivalent ratio of active hydrogens in the curing agent(s) to the epoxy groups present in the composition is below 1.00:1.00, the number of B—OY2 groups present in the composition preferably is equal to 15-50% of the number of active hydrogens in the curing agent(s), preferably 15-40%.

Curing agent(s) with their active hydrogens and epoxy-group containing compounds will be discussed in more detail below.

The coating composition comprises at least one epoxy-resin. Suitable epoxy resins are known in the art. They encompass, for example phenol novolac epoxy resins, bisphenol F epoxy resins, and resorcinol diglycidyl ether (RDGE) epoxy resin. Other suitable epoxy resins include diglycidyl ether of bisphenol A, bisphenol A novolac resins, hydrogenated bisphenol A, or bisphenol S, condensed or extended glycidyl ethers of any of the above bisphenols, hydrogenated condensed glycidyl ethers of bisphenols, dicyclopentadiene based epoxy resins, polyglycidyl ethers of polyhydric alcohols such as trimethylolpropane triglycidyl ether, glycerol triglycidylether, pentaerythritol tetraglycidyl ether, dipentaerythritol polyglycidyl ethers, butanediol diglycidyl ether, neopentylglycol diglycidyl ether, hexanediol diglycidyl ether and sorbitol glycidyl ether, epoxidised oils, epoxy compounds like diepoxyoctane and epoxidised polybutadienes.

In one embodiment, the epoxy resin comprises an aromatic epoxy resin, in particular a phenol novolac epoxy resin. Suitable phenol novolac epoxy resins are well known in the art, and require no further elucidation. Examples of phenol novolac epoxy resins that can be used in the composition in accordance with the present invention include DEN 425, DEN 431 and DEN 438 (ex DOW Chemicals), Epon 154, Epon 160, Epon 161 and Epon 162 (ex. Momentive Performance Chemicals), and Epalloy 8250 (ex. Emerald Chemical Co.). These epoxy compounds have an epoxy equivalent weight in the range of 165-185 g/eq. The epoxy equivalent weight is the weight of the epoxy resin required to yield one mole (or one equivalent) of epoxy functional groups. Other epoxy resins which may be used comprise epoxy cresol novolac resins, such as Epon 164 and Epon 165 (ex. Momentive Performance Chemicals), or bisphenol A epoxy novolac resins, such as the Epon SU range of resins.

In one embodiment, the epoxy resin comprises an aromatic epoxy resin, in particular a bisphenol F epoxy resin. Suitable bisphenol F epoxy resins are well known in the art, and require no further elucidation. Examples of bisphenol F epoxy resins that can be used in the composition in accordance with the present invention include DER 354 (ex. DOW Chemicals) or Epikote 862 (ex. Momentive performance Chemicals).

In one embodiment, the epoxy resin comprises an RDGE epoxy resin. An RDGE epoxy resin that can be used in the composition in accordance with the present invention is normally a low viscosity epoxy compound with an epoxy equivalent weight of 110-140 g/eq, more preferably 120-135 g/eq.

While RDGE epoxy resins are very attractive for manufacturing coatings with a very high chemical resistance, it is sometimes preferred to dispense with the use of RDGE, as this epoxy resin has very severe sensitizing properties. Therefore, in one embodiment the coating composition comprises less than 50 wt. % of RDGE epoxy resin, calculated on the total amount of epoxy resin, preferably less than 20 wt. %, more preferably less than 10 wt. % of RDGE, in particular less than 5 wt. % of RDGE, for example less than 2 wt. % of RDGE. It may be preferred for the coating composition to be essentially free from RDGE, which means that no RDGE is intentionally added to the composition.

It is a particular feature of the present invention, and a surprising and unexpected finding, that compositions can be prepared which comprise a relatively low amount of RDGE as described above, or are essentially free from RDGE, while still showing a very good chemical resistance.

Blends of any of the above epoxy resins may be used in combination with each other, but the epoxy phenol novolac resins or the bisphenol F epoxy resins are preferred when very high chemical resistance is required. It is therefore preferred for epoxy phenol novolac resins or the bisphenol F epoxy resins to make up at least 50% of the epoxy resin, calculated on the total of epoxy groups provided by the epoxy resin. More preferably, the epoxy phenol novolac resins or bisphenol F epoxy resins make up at least 60%, more in particular at least 70%, even more in particular at least 80% of the epoxy resin, calculated on the total of epoxy groups provided by the epoxy resin.

In particular, in order to minimize the solvent content of any coating composition containing the epoxy resin, it is preferred that the epoxy phenol novolac resin or the bisphenol F epoxy resin, if used, has a low solvent content, e.g., below 20 wt. %, preferably below 10 wt. %, based on the weight of epoxy phenol novolac resin or the bisphenol F epoxy resin. It is particularly preferred for the epoxy phenol novolac resin or the bisphenol F epoxy resin to be free of solvent.

The coating composition comprises an amine curing agent for the epoxy resin. As epoxy resins are electrophilic in nature, they commonly react with nucleophiles. The curing agents used in this invention comprise nucleophilic functional groups, in the present case amine groups, that react with epoxy groups. During the ring-opening reaction of an epoxide with a nucleophile (nucleophilic functional groups), a hydrogen atom is transferred from the nucleophile to the oxygen atom of the epoxide. This transferred hydrogen atom is referred to as the "active hydrogen". The reaction is illustrated:

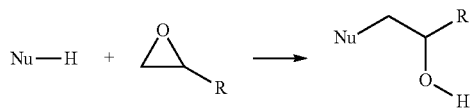

It is common therefore to quote the equivalent weight of the nucleophilic species in terms of the active hydrogen equivalent weight. This is simply the weight of nucleophilic species required to yield one mole (or one "equivalent") of hydrogen atoms transferable to the ring opened epoxy. In the case of an amine curing agent the active hydrogen equivalent weight of the amine curing agent is therefore the weight of the curing agent to give one mole (or one "equivalent") of N—H groups. A primary amine curing agent, for example, would have two active hydrogens as it can react with two epoxide groups.

The amine curing agent used in the present invention has on average at least two active hydrogens per molecule. The amine groups can be primary and/or secondary amine groups. An amine curing agent with more than one nitrogen atom may be termed a polyamine.

Examples of suitable polyamine curing agents are ethylene diamine, N-(2-hydroxyethyl)ethylene diamine, diethylene triamine, triethylene tetramine, tetraethylene pentamine, and the curing agents commonly manufactured by reacting these polyamine curing agents with fatty acids and dimer fatty acids, leading to amidoamines and amine functional polyamide curing agents. Examples of such curing agents are described in "Protective Coatings, Fundamentals of Chemistry and Composition", by Clive H. Hare, published by the Society for Protective Coatings (ISBN 0-938477-90-0) and are hereby incorporated by reference. Further polyamine curing agents are dicyandiamide, isophorone diamine, m-xylylene diamine, m-phenylene diamine, 1,3-bis(aminomethyl)cyclohexane, bis(4-aminocyclohexyl) methane, bis(4-amino-3-methylcyclohexyl) methane, N-aminoethyl piperazine, 4,4'-diaminodiphenyl methane, 4,4'-diamino-3,3'-diethyl-diphenyl methane, diaminodiphenyl sulfone, and Mannich base curing agents. Commercial grade quality curing agents of any of these polyamine curing agents may be used, for example Ancamine 2264 (ex. Air Products) is a commercial quality curing agent comprising mainly bis(4-aminocyclohexyl) methane. Examples of amine curing agents are described in "Protective Coatings, Fundamentals of Chemistry and Composition", by Clive H. Hare, published by the Society for Protective Coatings (ISBN 0-938477-90-0), "Epoxy Resins" by H Lee and K Neville, published by LLC (ISBN 978-1258243180), "Resins for Coatings", edited by D Stoye and W Freitag, published by Hanser (ISBN 978-1569902097) and are hereby incorporated by reference.

Adducts of any of these amines can also be used. Such adducts can be prepared by reaction of the amine with a suitably reactive compound such as a silicon-free epoxy resin or an epoxy functional reactive diluent, for example butyl glycidyl ether. This will reduce the free amine content of the curing agent, making it more suitable for use under conditions of low temperature and/or high humidity. Further examples of epoxy-functional reactive diluents are described in "Protective Coatings, Fundamentals of Chemistry and Composition", by Clive H. Hare, published by the Society for Protective Coatings (ISBN 0-938477-90-0) and are hereby incorporated by reference. Adducts of any of these amines can also be prepared by reaction of the amine with a suitably reactive compound such as an acrylate, a maleate, a fumarate, a methacrylate, or even electrophilic vinyl compounds such as acrylonitrile.

Cycloaliphatic amines have been found to give good chemical resistance in the composition of the present invention. Examples of suitable cycloaliphatic amine curing agents include bis(4-aminocyclohexyl) methane as shown below, and isophorone diamine.

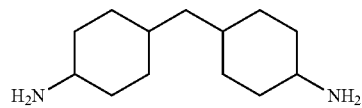 [SMILES: NC1CCC(CC2CCC(N)CC2)CC1]

The amine curing agent used in the present invention will be capable of at least partially curing the epoxy resin at a temperature in the range of 0 to 50° C. as discussed above.

Mixtures of amine curing agents can also be used.

Depending on the further components, the amine curing agent may comprise at least one aminofunctional silane or siloxane as amine curing agent. Suitable compounds will be discussed in more detail below. The use of a combination of a silicon-containing amine curing agent and a silicon-free amine curing agent is also envisaged.

Amino-functional silanes and amino-functional siloxanes suitable for use in the present invention include those of Formula 2,

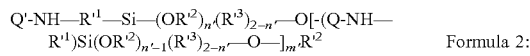

Formula 2:

wherein Q' represents the residue —$(CH_2CH_2NH)_{z'}$—H or an aminoaryl group, $R'^1$ represents an aliphatic alkyl group with 1-6 carbon atoms, $R'^2$ represents an aliphatic monovalent C1-C6 alkyl group, $R'^3$ represents an aliphatic monovalent C1-C6 alkyl group or a monovalent C6 aromatic group, n' is 1 or 2, and m' is an integer greater than or equal to zero. In formula 2, z' has value 0, 1 or 2.

$R'^1$ preferably has 2-4 carbon atoms, more preferably 3. $R'^2$ preferably is methyl, ethyl or propyl, more preferably methyl. $R'^3$ preferably is an aliphatic C1-C6 alkyl group, more in particular methyl, ethyl or propyl, more preferably methyl or a monovalent C6 aromatic group, preferably phenyl.

When n'=2, $R'^3$ is non-existent. When m'=0, the general formula describes the amino-functional silanes. When m'>0, the general formula describes amino-functional siloxanes. For the amino-functional siloxanes, m' may vary within wide ranges. It is generally preferred for the amino-functional silanes used in the present invention to have a number average value for m' of at most 10. Suitable amino-functional silane or siloxane compounds are known in the art.

Examples of suitable amino-functional silanes or siloxanes include aminopropyltriethoxysilane (Q'=—H, $R'^1$=—$CH_2CH_2CH_2$—, $R'^2$=—$CH_2CH_3$, $R'^3$ is non-existent and m'=0 in formula 2), aminopropyltrimethoxysilane (Q'=—H, $R'^1$=—$CH_2CH_2CH_2$—, $R'^2$=—$CH_3$, $R'^3$ is non-existent and m'=0 in formula 2), aminophenyltrimethoxysilane (Q'=—$C_6H_4NH_2$, $R'^1$ is non-existent, $R'^2$=—$CH_3$, $R'^3$ is non-existent and m'=0 in formula 2), N-(2-aminoethyl)-3-aminopropyltriethoxysilane (Q'=—$NHCH_2CH_2NH_2$, $R'^1$=—$CH_2CH_2CH_2$—, $R'^2$=—$CH_2CH_3$, $R'^3$ is non-existent and m'=0 in formula 2), N-(2-aminoethyl)-3-aminopropyl trimethoxy silane (Q'=—$(CH_2CH_2NH)$—H, i.e. z'=1 in formula 2, $R'^1$=—$CH_2CH_2CH_2$—, $R'^2$=—$CH_3$, $R'^3$ is non-existent and m'=0 in formula 2), and (3-trimethoxysilylpropyl) diethylene-triamine (Q'=—$(CH_2CH_2NH)_2$—H, i.e. z'=2 in formula 2, $R'^1$=—$CH_2CH_2CH_2$—, $R'^2$=—$CH_3$, $R'^3$ is non-existent and m'=0 in formula 2).

There are many further suitable compounds which may be used, including Silres HP2000 from Wacker, (a compound of formula 2 wherein m'=2, n'=1, $R'^2$=$CH_3$, $R'^3$=phenyl). This is an example of an amino-siloxane. Amines with alkoxysilane units related to the present invention also include aminoalkyl alkyldialkoxysilanes, aminoalkyl dialkylalkoxysilanes and precondensed aminoalkyl alkoxysilanes. Other suitable compounds include the Dynasylan range of amino functional siloxanes, available from Evonik, including bis(trimethyoxysilylpropyl) amine, a secondary amine functional siloxane (Dynasylan 1124), or 3-aminopropyltrimethoxy silane (Dynasylan AMMO).

It is preferred for the amine curing agent (i.e. the total amount of amine curing agent present in the coating composition) to have on average at least 2 active hydrogens per molecule. It is within the scope of the skilled person to select an amine curing agent (or combination of amine curing agents) which has sufficient amine functionality to obtain adequate crosslinking.

In one embodiment of the present invention, the amount of amine curing agent present in the coating composition is such that the equivalent ratio of the active hydrogens in the curing agent to the total number of epoxy groups in the composition is between about 0.7:1.00 and 1.3:1.00, in particular between 0.85:1.00 and 1.10:1.00. This ratio of active hydrogen to epoxy groups enables efficient curing of the coating composition according to the invention. The term active hydrogens in the curing agent encompasses active hydrogens derived from all amine curing agents present in the composition (both silicon-free amine curing agent and from silicon-containing amine curing agent (i.e. amino-functional silanes and amino-functional siloxanes).

In one embodiment, the coating composition further comprises a reactive diluent. As is well known to the skilled person, a reactive diluent is an additive which behaves like a solvent in reducing the viscosity of a composition but unlike a solvent does not contribute to the VOC of the composition because it possesses reactive groups which allow it to either bind into coating resins or undergo a chemical reaction independent of the main curing reaction. A reactive diluent which possesses the same chemical functionality as one of the main binder components, for example the phenol novolac epoxy resin or the bisphenol F epoxy resin in the present composition, can generally be distinguished from the resin by its lower viscosity and by its inability to form a coherent, mechanically robust coating film fit for the intended purpose when cured in the absence of the resin for which it is a diluent, often as a result of possessing an insufficient number of functional groups to allow polymer network formation to take place.

A reactive diluent can be present in reasonable amounts, for example supplying 50% or less of the total reactive functionality of the coating pack with which it is used to reduce the viscosity, but as a general rule it will be present in lesser amounts compared to the resin which it is used to dilute.

It has been found that the presence of a reactive diluent makes it easier to formulate the coating to a sprayable composition. Spraying is the preferred manner for applying the coating composition. Within the meaning of the present specification reactive diluents are compounds which reduce the viscosity of the coating composition, and which contain groups which can react with themselves, with the epoxy resin, and/or with the amine curing agent.

Preferred reactive diluents are epoxy-functional silanes, epoxy-functional siloxanes, and dialkyl carbonates. The coating composition of the invention may also comprise reactive diluent compounds which do not possess curing agent—reactive functionality. Examples of suitable compounds are phenyltriethoxysilane, methyltriethoxysilane, phenyltrimethoxysilane, and methyltrimethoxysilane.

In particular glycidoxypropyl trimethoxy silane (GOPTMS) and dimethyl carbonate (DMC) are preferred, because these compounds were found to provide a sprayable composition whilst maintaining the chemical resistance of the coating which does not contain the reactive diluents. The use of GOPTMS is considered particularly preferred, because it has been found that this compound also improves the chemical resistance of the coating composition. Therefore, it is a particular embodiment of the present invention for the coating composition to comprise glycidoxypropyl trimethoxy silane (GOPTMS). With only one epoxide group, GOPTMS cannot form a polymer network with an amine curing agent in its own right through the reaction of the epoxide groups alone. It can therefore be distinguished from the epoxy resin in this regard.

If it is used, the amount of reactive diluent used in the composition may vary within wide ranges. For example, sufficient material may be added to reduce the viscosity of the composition to the level desired for effective spray application of the composition. This will vary depending on the epoxy resin used and the selected reactive diluent compound.

Where the reactive diluent comprises one or more epoxide groups, e.g., in the case of GOPTMS, it may be present, e.g., in an amount of 0 to 50%, in particular 10 to 35% calculated from the number of epoxide groups in the reactive diluent on the total number of epoxide groups present in the coating composition.

Where the reactive diluent does not comprise epoxide groups, it will generally be present in an amount of less than 30 wt. %, calculated on the weight of the epoxy resin.

In one embodiment of the present invention, the coating composition comprises at least one epoxy-functional silane or siloxane. Within the context of the present specification, the term epoxy-functional silane refers to monoglycidylalkoxysilanes and epoxy-functional siloxane refers to mono and polyglycidylpolysiloxane compositions comprising any component of the composition containing at least one —Si—O—Si— linkage.

Epoxy-functional silanes and epoxy-functional siloxanes suitable for use in the present invention include those of Formula 1,

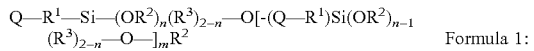

Formula 1:

wherein Q represents a glycidoxy group

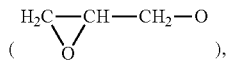

$R^1$ represents an aliphatic alkyl group with 1-6 carbon atoms, $R^2$ represents an aliphatic monovalent C1-C6 alkyl group, $R^3$ represents an aliphatic monovalent C1-C6 alkyl group or a monovalent C6 aromatic group, n is 1 or 2, and m is an integer greater than or equal to zero.

$R^1$ preferably has 2-4 carbon atoms, more preferably 3. $R^2$ preferably is methyl, ethyl or propyl, more preferably methyl. $R^3$ preferably is an aliphatic C1-C6 alkyl group, more in particular methyl, ethyl or propyl, more preferably methyl or a monovalent C6 aromatic group, preferably phenyl.

When n=2, $R^3$ is non-existent. When m=0, the general formula describes the epoxy-functional silanes. When m>0, the general formula describes the epoxy-functional siloxanes. For the epoxy-siloxanes, m may vary within wide ranges. It is generally preferred for the epoxy-functional silanes used in the present invention to have a number average value for m of at most 10. Suitable epoxy-functional silane or siloxane compounds are known in the art.

In one embodiment, an epoxy-functional silane is used of formula 1 wherein $R^1$=—$CH_2CH_2CH_2$—, $R^2$=$CH_3$, $R^3$ is non-existent, n=2 and m=0. This compound has the formula

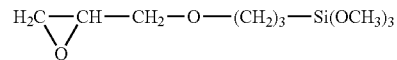

This material is glycidoxypropyl trimethoxysilane (GOPTMS) and for example is available from Evonik (under the trade name Dynasylan GLYMO).

In another embodiment, an epoxy-functional siloxane oligomer is used having an —(Si—O)— backbone and pendant epoxy groups. In one embodiment, an epoxy-functional siloxane oligomer of this type is used which is of formula 1 above, wherein $R^1$=—$CH_2CH_2CH_2$—, $R^2$=$CH_3$, $R^3$ is non-existent, n=2 and m has a number average value in the range of 2 to 8, in particular 3-5, e.g. around 4. Such a material is manufactured by Momentive Performance Chemicals and sold under the trade name Momentive MP200.

There are many further suitable compounds which may be used, including glycidoxypropyl triethoxysilane (a compound of formula 1 wherein $R^1$=—$CH_2CH_2CH_2$—, $R^2$=$CH_2CH_3$, $R^3$ is non-existent, n=2 and m=0), Silres HP1000 from Wacker, (a compound of formula 1 wherein m=2, n=1, $R^2$=$Ch_3$, $R^3$=phenyl), glycidoxypropyl dimethylethoxysilane (a compound of formula 1 wherein $R^1$=—$CH_2CH_2CH_2$—, $R^2$=$CH_2CH_3$, $R^3$=$CH_3$, n=0 and m=0), 3-glycidoxypropyl methyldimethoxysilane (a compound of formula 1 wherein $R^1$=—$CH_2CH_2CH_2$—, $R^2$=$CH_3$, $R^3$=$CH_3$, n=1 and m=0), 3-glycidoxypropyl methyldiethoxysilane (a compound of formula 1 wherein $R^1$=—$CH_2CH_2CH_2$—, $R^2$=$CH_2CH_3$, $R^3$=$CH_3$, n=1 and m=0).

In one embodiment, one or more of the following epoxy-functional silanes and epoxy-functional siloxanes are used, wherein $R^4$ is a glycidoxy group, e has a value of 0.1 to 0.5, f has a value of 0.1 to 0.5 and g has a value of 0.5 to 0.9:

epoxy-functional silicon materials comprising the units: $(R^4(CH_3)_2SiO_{1/2})_e$ and $(C_6H_5SiO_{3/2})_g$ epoxy-functional silicon materials comprising the units: $(R^4(CH_3)_2SiO_{1/2})_e$, $((CH_3)_2SiO_{2/2})_f$ and $(C_6H_5SiO_{3/2})_g$ epoxy-functional silicon materials comprising the units: $((CH_3)_3SiO_{1/2})_e$, $(R^4(CH_3)SiO_{2/2})_f$ and $(C_6H_5SiO_{3/2})_g$ epoxy-functional silicon materials comprising the units: $(R^4(CH_3)SiO_{2/2})_f$ and $(C_6H_5SiO_{3/2})_g$ epoxy-functional silicon materials comprising the units: $(R^4(CH_3)_2SiO_{1/2})_e$, and $(CH_3SiO_{3/2})_g$ epoxy-functional silicon materials comprising the units: $(R^4(CH_3)_2SiO_{1/2})_e$, $((CH_3)_2SiO_{2/2})_f$ and $(CH_3SiO_{3/2})_g$ epoxy-functional silicon materials comprising the units: $((CH_3)_3SiO_{1/2})_e$, $(R^4(CH_3)SiO_{2/2})_f$ and $(CH_3SiO_{3/2})_g$ epoxy-functional silicon materials comprising the units: $(R^4(CH_3)SiO_{2/2})_f$ and $(CH_3SiO_{3/2})_g$ epoxy-functional silicon materials comprising the units: $((CH_3)_2SiO_{2/2})_f$ and $(R^4SiO_{3/2})_g$.

In one embodiment the coating composition comprises an accelerator which speeds up the curing reaction between the epoxy groups of the epoxy resin and the functional groups of the amine curing agent.

Examples of accelerators known to speed up the curing reaction between an epoxy resin and the curing agent include the following: alcohols, phenols, carboxylic acids, sulphonic acids, salts and tertiary amines:

Examples of accelerators known to speed up the curing reaction between an epoxy resin and the amine curing agent include the following: alcohols, phenols, carboxylic acids, sulphonic acids, salts, and tertiary amines:

Alcohols: Examples of suitable alcohols include ethanol, 1-propanol, 2-propanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other beta-hydroxy tertiary amines.

Phenols: Examples of suitable phenols include phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrophenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenyl, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucide, calixarene, poly(4-vinylphenol) and other polybasic phenols.

Carboxylic acids: Examples of suitable carboxylic acids include acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids.

Sulphonic acids: Examples of suitable sulphonic acids include methanesulphonic acid and other alkyl sulphonic acids, p-toluenesulphonic acid, 4-dodecylbenzenesulphonic acid, and other aromatic sulphonic acids, naphthalene disulphonic acid, di-nonyl naphthalene disulphonic acid and other polybasic sulphonic acids Salts: Examples of suitable salts include calcium nitrate, calcium naphthenate, ammonium thiocyanate, sodium thiocyanate, potassium thiocyanate, imidazolinium thiocyanate, lithium tetrafluoroborate, lithium bromide, lithium trifluoroacetate, calcium chloride, ytterbium triflate, lithium perchlorate, zinc triflate, lithium nitrate. For all these salts, the cation could be interchanged with lithium, sodium or potassium.

In the coating composition of the present invention an anionic polymerisation of the epoxy groups may also occur. In one embodiment, anionic polymerisation of the epoxy groups is accelerated by including an accelerator in the composition. Examples of suitable anionic polymerisation accelerators are tertiary amines, like 1,8-diaza-bicyclo[5.4.0]undec-7-ene, triethylene diamine (diazabicyclooctane), benzyldimethylamine, dimethylaminopropylamine, diethylaminopropylamine, N-methylmorpholine, 3-morpholinopropylamine, triethanolamine, dimethylaminoethanol, 2-dimethylaminomethylphenol, 4-dimethylaminomethylphenol, 2,4-bis(dimethylaminomethyl)phenol, 2,6-bis(dimethylaminomethyl)phenol, and 2,4,6-tris(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole. These accelerators also speed up the cure between the epoxy groups of the epoxy resins and the functional groups of the curing agent having an active hydrogen.

Preferred accelerators in the context of this application include, tertiary amines, like 1,8-diaza-bicyclo[5.4.0]undec-7-ene, triethylene diamine (diazabicyclooctane), benzyldimethylamine, triethanolamine, and 2,4,6-tris-(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole, optionally in combination with one or more of the other catalysts and accelerators mentioned above.

The tertiary amine accelerators also function as catalysts for the hydrolysis and condensation of the alkoxysilane groups of the organosilane or organosiloxane discussed above for use in the present invention.

In addition to the tertiary amines, the amine groups of the curing agent, either in their unreacted or reacted form, will also accelerate the hydrolysis and condensation reactions of the alkoxysilane groups present on the GOPTMS or other similar reactive diluent, if present, it may also be advantageous to add an accelerator which speeds up this process as well. Certain of these accelerators can also promote an anionic polymerisation of the epoxy groups in the epoxy resin(s) present in the composition. It is also possible to add accelerators which speed up the hydrolysis and condensation of the alkoxysilane groups, but which do not have a significant impact on the reaction between the amine groups and the epoxy groups, or on the anionic polymerisation of the epoxy epoxy groups. Examples of such accelerators are dibutyltin dilaurate, dioctyltin dialaurate, dibutyltin diacetate, bismuth neodecanoate, titanium tetrabutoxide, titanium tetraisopropoxide, poly(n-butyl titanate) and the like.

The accelerator(s), if present, are suitably used in an amount of 0.1 to 5 parts by weight relative to 100 parts by weight of the epoxy resin, preferably 0.5 to 5 parts by weight relative to 100 parts by weight of the epoxy resin.

It is preferred for the accelerator(s) to be present in the pack containing the amine curing agent. It is not recommended that the accelerator(s) are present in the pack containing the epoxy resin mixture, as this could reduce the shelf life of this pack.

In one embodiment, the coating composition of the invention comprises one or more pigments and/or fillers. The one or more pigments may be coloring pigments for example titanium dioxide (white pigment), coloured pigments such as yellow or red iron oxide or a phthalocyanine pigment. The one or more pigments may be strengthening pigments such as micaceous iron oxide, crystalline silica and wollastonite. The one or more pigments may be anticorrosive pigments such as zinc phosphate, molybdate or phosphonate. The one or more pigments may be a filler pigment such as barytes, talc, feldspar, or calcium carbonate.

The composition may contain one or more further ingredients, for example a thickening agent or thixotrope such as fine-particle silica, bentonite clay, hydrogenated castor oil, or a polyamide wax. The composition may also contain a plasticiser, pigment dispersant, stabiliser, flow aid, wetting agent, defoamer, adhesion promotor, or thinning solvent. In one embodiment, the coating composition used in the present invention has a solvent content of at most 250 g/l, in particular at most 200 g/l, more in particular at most 150 g/l, still more in particular at most 100 g/l. It may be preferred for the solvent content to be at most 50 g/l. In one embodiment, the composition has no added solvent.

Solvent content may be determined as follows: The solvent content comprises those ingredients which are liquid at 0-50° C., which are not reactive with the epoxy resin or the amine curing agent, and which possess a vapour pressure of more than 0.01 kPa at 25° C. or a boiling point of less than 250° C. at 1 atmosphere pressure. For the purposes of clarity, any volatile material according to the above definition produced by the curing of the coating composition is not included in the solvent content.

The coating composition is a two-pack coating composition wherein the first pack comprises an epoxy resin and the second pack comprises an amine curing agent for the epoxy resin. It is a feature of the method according to the invention that the coating is cured at a temperature in the range of 0 to 50° C. This feature is related to the use of a two-pack coating composition, as a composition which shows curing at a temperature in the range of 0 to 50° C. shows insufficient shelf life in a one-pack coating composition.

The coating composition of the present invention is capable of at least partially curing the epoxy-functional resin at a temperature in the range of 0 to 50° C. The coating composition of the present invention is therefore an ambient temperature curable coating composition. If this requirement is not met, the composition is less suitable for coating metallic or concrete surfaces in a chemical installation. It is a feature of the method according to the invention that the coating composition is cured in a first step at a temperature in the range of 0 to 50° C., e.g. 10-30° C., more in particular 15-25° C. In this step, curing should take place at least to the extent that water can be subsequently sprayed on to the coating or the coating can be physically handled without disrupting the coating surface. This step will be further indicated as the ambient curing step. The ambient curing step can, e.g., be carried out for a time of 1 to 24 hours, in particular 3 to 10 hours, wherein higher temperatures will reduce the required curing time and wherein lower temperatures will increase the required curing time.

It may be preferred for the ambient curing step to be carried out in the relative humidity range of 0-100%, more preferably in the range 20-80%, most preferably in the range 40-60%. Where the surface to be coated is relatively enclosed, e.g., where it is part of a tank, it is common practice to control the relative humidity during the coating operations, to ensure film formation takes place to deliver an integral coating, free from significant defects.

Often, in order to deliver a coating with the optimum chemical resistance performance, it is advantageous to further cure the coating composition in a second step, particularly where the coating will come into contact with very aggressive chemicals. In this second step, which will also be indicated as post-curing step, the coating layer is heated to a temperature above 50° C. for a given time, e.g., for a period of, e.g., 1 to 24 hours, in particular 3 to 16 hours. In general, post-curing can take place at a temperature of at least 50° C., e.g., 50-150° C. In one embodiment, post-curing will take place at a temperature of 50-100° C., e.g., 50-80° C. In another embodiment, post-curing will take place at a temperature of 100-150° C.

How post-curing is effected will depend on the nature of the surface to be coated, and will be evident to the person skilled in the art. For example, curing can be effected by heating the surface with hot air or hot water, e.g., by spraying. Where the chemical installation is a tank, heating can also be effected by, e.g., contacting the coated surface with hot cargo, using the heat from the cargo to effect the additional curing, or filling the tank with hot water. The performance of a post-curing step at a temperature of at least 50° C. is a preferred embodiment of the present invention.

In one embodiment, the post-curing is performed by heating the surface with hot air or contacting the coated surface with hot cargo.

The coating composition can be applied to the surface to be coated by methods known in the art. Examples of suitable methods include rolling, spraying, and brushing. Application by spraying is preferred, as it leads to efficient deposition of a homogeneous coating layer. It is a feature of the present invention that the coating composition can be formulated to have a sprayable viscosity without having to resort to substantial amounts of solvents. The composition may, e.g., be applied through single feed airless spray technology, or via plural component application technology.

Each coating layer applied in the present invention may have a thickness after curing of, e.g., 50 to 350 micron, in particular 75 to 200 micron. This thickness applies to each layer, irrespective of whether they are cured individually after application, or at the same time.

The present invention pertains to the coating of the metallic or concrete surface of a chemical installation. In the context of the present specification "Chemical installation" means buildings, man-made structures and/or equipment that are used to produce and/or store and/or transport liquid or gaseous bulk chemicals. Specific examples of chemical installations includes buildings, man-made structures and/or equipment in both existing and new chemical installations for the shipping or marine industry, oil and gas industry, the chemical processing industry, the power industry, the waste and water industry, the transportation industry, and the mining and metals industry.

Bulk chemicals refers to chemicals which are present in bulk, i.e., in a volume of at least 10 m$^3$. Bulk chemicals vary from being completely harmless to very aggressive to steel, concrete and or other materials. Liquid bulk chemicals can be broadly categorized into edible and non-edible commodities. Examples of edible liquid bulk chemical cargos are fruit juices, milk and vegetable oils, while examples of non-edible bulk chemicals include chemical solvents, reactive chemical intermediates such as vinyl acetate, petroleum, acids, alkalis and liquefied natural gas (LNG).

The metallic or concrete surface may comprise both the internal and external surfaces of storage tanks, storage vessels, their associated pipework or other pipework in general, flues and containment areas. In addition to the liquid or gaseous chemicals, such metal or concrete surfaces in chemical installations may be exposed to high temperatures, whether static or cycled, and also high pressures, whether static or cycled.

In one embodiment, the chemical installation coated in the present invention is a chimney, pipe, or tank, e.g., a cargo or storage tank.

It has been found that the coating composition according to the present invention shows particularly good results as a tank lining composition, combining a low absorption for a wide variety of chemicals with a good washability, resulting in the coating composition being able to withstand cyclic loading with various types of bulk chemicals. It has further been found that the coating composition has a good thermal stability at elevated temperature, which makes it suitable for use in storage tanks on land, where high temperature may be an issue. The present invention is of particular use in and for cargo tanks, but also for further tanks, such as land based storage tanks for a variety of chemicals and crude oil or hydrocarbon-water mixtures, and secondary containment areas for these tanks.

The coating composition can be applied directly to surface as a primer/finish, i.e. the composition can be used as the only type of protective coating on a surface.

It is also possible to apply the coating composition according to the invention as a primer, i.e., to first apply the coating of the invention on the surface to form a first coating layer, cure the coating layer at a temperature of 0-50° C., provide a further coating onto the first coating layer to form a second coating layer, and cure the second coating layer. The application of further coating layers is also possible, to provide three or more layers of the coating composition of the invention. Usually no more than three layers are required, with the precise number being dependent on the thickness of the individual layers. If a post-curing step is carried out, it is preferred for this to be carried out after all layers have been deposited.

It is noted that the embodiments of coating composition described herein may be combined with each other in manners clear to the skilled person. This applies to all preferences, properties and compositions. All embodiments and properties described for the coating are also applicable to the method for providing a tank with a tank lining, and to the tank provided with a lining of the cured coating composition.

The invention will now be elucidated with reference to the following examples. These are intended to illustrate the invention but are not to be construed as limiting in any manner the scope thereof.

EXAMPLE 1

Example According to the Invention

This example according to the invention shows the effect of mixing an epoxy novolac resin with an amine curing agent and trialkylborate ester on the % mass uptake of vinyl acetate and ethylene dichloride without adding any resorcinol diglycidyl ether.

DEN 431 (ex. Dow Chemicals; 5.0 g, 0.0285 eq. epoxy) was thoroughly mixed at room temperature with a mixture of bis(4-aminocyclohexyl) methane (PACM; 1.496 g, 0.0285 eq. N—H) and triethylborate (0.416 g, 10 mol % based on eq. epoxy). In this composition 100% of the epoxy groups are from the DEN431 epoxy novolac resin. The equivalent ratio of active hydrogens to epoxy groups is 1.00.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 1.05 |
| 1,2-Dichloroethane | 2.50 |

EXAMPLE 2

Example According to the Invention

This example according to the invention shows the effect of mixing an epoxy novolac resin, where the viscosity of the resin has been modified through its combination with an epoxy-functional silane resin, so that 80% of the epoxy groups is derived from the epoxy novolac resin and 20% of the epoxy groups is derived from the epoxy-functional silane resin, and cured with an amine curing agent and a trialkylborate ester, on the % mass uptake of vinyl acetate and ethylene dichloride without adding any resorcinol diglycidyl ether.

DEN 431 (ex. Dow Chemicals; 5.0 g, 0.0285 eq. epoxy) was combined and blended with glycidoxypropyl trimethoxysilane (1.68 g, 0.00711 eq. epoxy) and thoroughly mixed at room temperature with a mixture of bis(4-aminocyclohexyl) methane (PACM; 1.87 g, 0.0356 eq. N—H), triethylborate (0.520 g, 10 mol % based on eq. epoxy) and tris(2,4,6-dimethylaminomethyl)phenol (0.189 g, 2 mol % based on eq. epoxy). The equivalent ratio of active hydrogens to epoxy groups is 1.00.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 0.80 |
| 1,2-Dichloroethane | 2.35 |

EXAMPLE 3

Example According to the Invention

This example according to the invention shows the effect of mixing an epoxy novolac resin, where the viscosity of the resin has been modified through its combination with an epoxy-functional siloxane resin, so that 70% of the epoxy groups is derived from the novolac resin and 30% of the epoxy groups is derived from the epoxy-functional silane resin, with an amine curing agent and a trialkylborate ester on the % mass uptake of vinyl acetate and ethylene dichloride without adding any resorcinol diglycidyl ether.

DEN 431 (ex. Dow Chemicals; 5.0 g, 0.0285 eq. epoxy) was combined and blended with MP200 (Momentive: 2.44 g, 0.01221 eq. epoxy) and thoroughly mixed at room temperature with a mixture of bis(4-aminocyclohexyl) methane (PACM; 2.14 g, 0.04071 eq. N—H) and triethylborate (0.594 g, 10 mol % based on eq. epoxy). The equivalent ratio of active hydrogens to epoxy groups is 1.00.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 0.70 |
| 1,2-Dichloroethane | 1.34 |

EXAMPLE 4

Example According to the Invention

This example according to the invention shows the effect of mixing an epoxy novolac resin, where the viscosity of the resin has been modified through its combination with an epoxy-functional silane resin, so that 80% of the epoxy groups is derived from the novolac resin and 20% of the epoxy groups is derived from the epoxy-functional silane resin where the combined epoxy resins are part of a pigmented paint formulation, with an amine curing agent and a trialkylborate ester on the % mass uptake of vinyl acetate and ethylene dichloride without adding any resorcinol diglycidyl ether.

A paint base according to the present invention was manufactured and comprised

| INGREDIENT | % WEIGHT |
| --- | --- |
| DEN 431 Epoxy novolac resin | 36.40 |
| Glycidoxypropyl trimethoxysilane | 12.23 |
| Nepheline syenite | 43.02 |

-continued

| INGREDIENT | % WEIGHT |
| --- | --- |
| Titanium dioxide | 7.75 |
| Yellow iron oxide | 0.45 |
| Polyamide wax thixotrope | 0.15 |

The above pigmented epoxy resin formulation (30 g, 0.0777 eq. epoxy) was thoroughly mixed at room temperature with a mixture of bis(4-aminocyclohexyl) methane (PACM; 4.08 g, 0.0777 eq. N—H), triethylborate (1.13 g, 10 mol % based on eq. epoxy) and tris(2,4,6-dimethylaminomethyl)phenol (0.413 g, 2 mol % based on eq. epoxy). The equivalent ratio of active hydrogens to epoxy groups is 1.00.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 0.69 |
| 1,2-Dichloroethane | 1.08 |

EXAMPLE 5

Example According to the Invention

This example according to the invention shows the effect of mixing an epoxy novolac resin, where the viscosity of the resin has been modified through its combination with an epoxy-functional silane resin, so that 80% of the epoxy groups is derived from the epoxy novolac resin and 20% of the epoxy groups is derived from the epoxy-functional silane resin, and cured with an amine curing agent which comprises a mixture of bis(4-aminocyclohexyl) methane with Dynasylan 1124, and a trialkylborate ester, on the % mass uptake of ethylene dichloride without adding any resorcinol diglycidyl ether.

DEN 431 (ex. Dow Chemicals; 8.0 g, 0.0456 eq. epoxy) was mixed with glycidoxypropyl trimethoxysilane (2.686 g, 0.0114 eq. epoxy) and thoroughly stirred at room temperature with a mixture of bis(4-aminocyclohexyl) methane (PACM; 2.71 g, 0.0516 eq. N—H), Dynasylan 1124 (1.941 g, 0.00568 eq. N—H), triethylborate (0.829 g, 10 mol % based on total eq. epoxy) and tris(2,4,6-dimethylaminomethyl)phenol (0.301 g, 2 mol % based on eq. epoxy). The equivalent ratio of active hydrogens to epoxy groups is 1.00.

The mixture was applied using a 400 micron cube applicator to 3 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing 1,2-ethylene dichloride. The mass uptake of 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides after 28 days immersion at room temperature.

| Immersion liquid | % Uptake |
|---|---|
| 1,2-Dichloroethane | 1.54 |

EXAMPLE 6

Example According to the Invention

This example according to the invention shows the effect of mixing an epoxy novolac resin, where the viscosity of the resin has been modified through its combination with an epoxy-functional silane resin, so that 80% of the epoxy groups is derived from the epoxy novolac resin and 20% of the epoxy groups is derived from the epoxy-functional silane resin, and cured with an amine curing agent which comprises a mixture of bis(4-aminocyclohexyl) methane with aminopropyltrimethoxysilane and Dynasylan 1124, and a trialkylborate ester, on the % mass uptake of ethylene dichloride without adding any resorcinol diglycidyl ether.

DEN 431 (ex. Dow Chemicals; 8.0 g, 0.0456 eq. epoxy) was mixed with glycidoxypropyl trimethoxysilane (2.686 g, 0.0114 eq. epoxy) and thoroughly stirred at room temperature with a mixture of bis(4-aminocyclohexyl) methane (PACM; 2.529 g, 0.0482 eq. N—H), aminopropyltrimethoxysilane (0.407 g, 0.00454 eq. N—H), Dynasylan 1124 (1.553 g, 0.00455 eq. N—H), triethylborate (0.829 g, 10 mol % based on total eq. epoxy) and tris(2,4,6-dimethylaminomethyl)phenol (0.301 g, 2 mol % based on eq. epoxy). The equivalent ratio of active hydrogens to epoxy groups is 1.00.

The mixture was applied using a 400 micron cube applicator to 3 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing 1,2-ethylene dichloride. The mass uptake of 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides after 28 days immersion at room temperature.

| Immersion liquid | % Uptake |
|---|---|
| 1,2-Dichloroethane | 1.71 |

EXAMPLE 7

Example According to the Invention

This example according to the invention shows the effect of mixing a bisphenol F epoxy resin, where the viscosity of the resin has been modified through its combination with an epoxy-functional silane resin, so that 80% of the epoxy groups is derived from the bisphenol F epoxy resin and 20% of the epoxy groups is derived from the epoxy-functional silane resin where the combined epoxy resins are part of a pigmented paint formulation, with an amine curing agent and a trialkylborate ester on the % mass uptake of vinyl acetate and ethylene dichloride without adding any resorcinol diglycidyl ether.

A paint base according to the present invention was manufactured and comprised

| INGREDIENT | % WEIGHT |
|---|---|
| DER 354 Epoxy resin | 29.56 |
| Glycidoxypropyl trimethoxysilane | 10.21 |
| Nepheline syenite | 47.99 |
| Titanium dioxide | 10.41 |
| Yellow iron oxide | 0.78 |
| Polyamide wax thixotrope | 0.58 |
| Defoamer | 0.47 |

The above pigmented epoxy resin formulation (19 g, 0.041 eq. epoxy) was thoroughly mixed at room temperature with a mixture Ancamine 2264 (ex. Air Products; 2.234 g, 0.041 eq. N—H), triethylborate (0.613 g, 10 mol % based on eq. epoxy) and tris(2,4,6-dimethylaminomethyl)phenol (0.222 g, 2 mol % based on eq. epoxy). The equivalent ratio of active hydrogens to epoxy groups is 1.00.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 0.41 |
| 1,2-Dichloroethane | 0.90 |

EXAMPLE 8

Example According to the Invention

This example according to the invention shows the effect of mixing a bisphenol F epoxy resin, where the viscosity of the resin has been modified through its combination with an epoxy-functional silane resin, so that 70% of the epoxy groups is derived from the bisphenol F epoxy resin and 30% of the epoxy groups is derived from the epoxy-functional silane resin where the combined epoxy resins are part of a pigmented paint formulation, with an amine curing agent and a trialkylborate ester on the % mass uptake of ethylene dichloride without adding any resorcinol diglycidyl ether.

A paint base according to the present invention was manufactured and comprised

| INGREDIENT | % WEIGHT |
| --- | --- |
| DER 354 Epoxy resin | 25.05 |
| Glycidoxypropyl trimethoxysilane | 14.81 |
| Nepheline syenite | 47.94 |
| Titanium dioxide | 10.40 |
| Yellow iron oxide | 0.78 |
| Polyamide wax thixotrope | 0.56 |
| Defoamer | 0.46 |

The above pigmented epoxy resin formulation (17.5 g, 0.0366 eq. epoxy) was thoroughly mixed at room temperature with a mixture Ancamine 2264 (ex. Air Products; 1.985 g, 0.0368 eq. N—H), and triethylborate (0.537 g, 10 mol % based on eq. epoxy). The equivalent ratio of active hydrogens to epoxy groups is 1.00.

The mixture was applied using a 400 micron cube applicator to 3 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing 1,2-ethylene dichloride. The mass uptake of 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides after 28 days immersion at room temperature.

| Immersion liquid | % Uptake |
| --- | --- |
| 1,2-Dichloroethane | 0.69 |

EXAMPLE 9

Example According to the Invention

This example according to the invention shows the effect of mixing a blend of phenol novolac epoxy resin and a bisphenol F epoxy resin, where the viscosity of the epoxy resin blend has been modified through its combination with an epoxy-functional silane resin, so that 70% of the epoxy groups is derived from the mixture of epoxy novolac resin and the bisphenol F epoxy resin and 30% of the epoxy groups is derived from the epoxy-functional silane resin where the combined epoxy resins are part of a pigmented paint formulation, with an amine curing agent and a trialkylborate ester on the % mass uptake of ethylene dichloride without adding any resorcinol diglycidyl ether.

A paint base according to the present invention was manufactured and comprised

| INGREDIENT | % WEIGHT |
| --- | --- |
| DER 354 Epoxy resin | 12.58 |
| DEN 431 Epoxy novolac resin | 12.58 |
| Glycidoxypropyl trimethoxysilane | 14.79 |
| Nepheline syenite | 47.87 |
| Titanium dioxide | 10.39 |
| Yellow iron oxide | 0.77 |
| Polyamide wax thixotrope | 0.56 |
| Defoamer | 0.46 |

The above pigmented epoxy resin formulation (15.0 g, 0.0313 eq. epoxy) was thoroughly mixed at room temperature with a mixture Ancamine 2264 (ex. Air Products; 1.709 g, 0.0316 eq. N—H), and triethylborate (0.455 g, 10 mol % based on eq. epoxy). The equivalent ratio of active hydrogens to epoxy groups is 1.00.

The mixture was applied using a 400 micron cube applicator to 3 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing 1,2-ethylene dichloride. The mass uptake of 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides after 28 days immersion at room temperature.

| Immersion liquid | % Uptake |
| --- | --- |
| 1,2-Dichloroethane | 0.67 |

COMPARATIVE EXAMPLE 1

Comparative Example with Coating Based on Epoxy Phenol Novolac as Sole Epoxy Resin in the Absence of a Boron Compound In this comparative example the relatively high absorption of various organic liquids in a coating prepared using an epoxy phenol novolac (DEN 431) as the sole epoxy resin is illustrated.

DEN 431 (ex. Dow Chemicals; 5.0 g, 0.0285 eq. epoxy) was thoroughly mixed at room temperature with a mixture of bis(4-aminocyclohexyl) methane (PACM; 1.496 g, 0.0285 eq. N—H). The equivalent ratio of active hydrogens to epoxy groups is 1.00.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jars containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature. Both for vinyl acetate and 1,2-dicloroethane, the coating shows a higher contaminant uptake than the coatings containing organoboron compounds.

| Immersion liquid | % Uptake |
| --- | --- |
| Vinyl acetate | 1.63 |
| 1,2-Dichloroethane | 17.89 |

COMPARATIVE EXAMPLE 2

Comparative Example with Coating Based on RDGE

In this comparative example, the low absorption of various organic liquids in a coating prepared using resorcinol diglycidyl ether (RDGE) as the sole epoxy resin is illustrated.

Resorcinol diglycidyl ether (ex. CVC, 8.0 g, 0.06349 eq. epoxy) was thoroughly mixed at room temperature with a mixture of bis(4-aminocyclohexyl) methane (PACM) (1.1581 g, 0.02186 eq. N—H), 1-methylimidazole (0.1906 g) and 2-ethyl-4-methyl-imidazole (0.1173 g). The equivalent ratio of active hydrogens to epoxy groups is 0.34.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 1.61 |
| 1,2-Dichloroethane | 2.12 |

A comparison between this Example and the Examples according to the invention shows that the invention makes it possible to obtain coatings which perform as well, or better than, as RDGE-based coatings, while the use of the highly sensitising RDGE can be dispensed with.

COMPARATIVE EXAMPLE 3

Comparative Example with Coating Based on RDGE and Epoxy Phenol Novolac

In this comparative example the low absorption of various organic liquids in a coating prepared using a blend of resorcinol diglycidyl ether (RDGE) with an epoxy phenol novolac (DEN 431) is illustrated.

Resorcinol diglycidyl ether (ex. Emerald Chemical Co., 5.0 g, 0.0397 eq. epoxy) was added to DEN 431 (ex. Dow chemicals, 1.529 g, 0.0087 eq. epoxy) and thoroughly mixed at room temperature with a mixture of Ancamine 2264 (ex. Air Products, 0.956 g, 0.0177 eq. N—H), 1-methylimidazole (0.1941 g), 2-ethyl-4-methyl-imidazole (0.078 g) and tris(dimethylaminomethyl)phenol (0.122 g). The equivalent ratio of active hydrogens to epoxy groups is 0.37.

The mixture was applied using a 400 micron cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-ethylene dichloride. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 3.18 |
| 1,2-Dichloroethane | 2.93 |

A comparison between this Example and the Examples according to the invention shows that the invention makes it possible to obtain coatings which perform as well as, or better than, RDGE-based coatings, while the use of the highly sensitising RDGE can be dispensed with.

The invention claimed is:

1. A method for providing a metallic or concrete surface of a chemical installation with a coating, which comprises providing a two-pack coating composition wherein the first pack comprises an epoxy resin and the second pack comprises an amine curing agent for the epoxy resin, the coating composition further comprising an organoboron compound of the formula BX1X2X3, wherein X1, X2, and X3 are independently selected from —Y1 and —OY2, wherein Y1 is independently selected from monovalent C1-C12 alkyl groups and monovalent C6-C12 aryl groups, and Y2 is independently selected from monovalent C1-C12 alkyl groups and monovalent C6-C12 aryl groups, and wherein at least one of X1, X2, and X3 is an —OY2 group, wherein the organoboron compound is present in such an amount that
when the equivalent ratio of active hydrogens in the curing agent(s) to the epoxy groups present in the composition is 1.00:1.00 or higher, the number of B—OY2 groups present in the composition is equal to 5-80% of the number of epoxy groups present in the composition, and
when the equivalent ratio of active hydrogens in the curing agent(s) to the epoxy groups present in the composition is below 1.00:1.00, the number of B—OY2 groups present in the composition is equal to 5-80% of the number of active hydrogens in the curing agent(s),
combining the first pack and the second pack to form a coating composition,
applying the coating composition to the surface of a chemical installation to form a coating layer, and
allowing the coating layer to cure at a temperature in the range of 0 to 50° C., wherein the chemical installation is a chimney, pipe, or tank.

2. The method according to claim 1, wherein the coating layer is further subjected to a temperature above 50° C. after curing.

3. The method according to claim 1, wherein Y1 and Y2 are independently a C1-C8 alkyl or a C6-C8 aryl.

4. The method according to claim 3, wherein Y1 and Y2 are independently a C2-C5 alkyl.

5. The method according to claim 1, wherein all of X1, X2, and X3 are independently selected —OY2 groups, wherein each Y2 group is independently a C1-C8 alkyl or a C6-C8 aryl.

6. The method according to claim 1 wherein the coating composition comprises less than 10 wt. % of RDGE (resorcinol diglycidyl ether).

7. A chemical installation comprising a metallic or concrete surface provided with a lining of a cured coating composition, wherein the coating composition is derived from a coating composition comprising epoxy resin and amine curing agent for the epoxy resin, the coating composition further comprising an organoboron compound of the formula BX1X2X3, wherein X1, X2, and X3 are independently —Y1 or —OY2, wherein each Y1 is independently a monovalent C1-C12 alkyl or a monovalent C6-C12 aryl, and each Y2 is independently a monovalent C1-C12 alkyl or a monovalent C6-C12 aryl, and wherein at least one of X1, X2, and X3 is an —OY2 group, wherein the organoboron compound is present in such an amount that
when the equivalent ratio of active hydrogens in the curing agent(s) to the epoxy groups present in the composition is 1.00:1.00 or higher, the number of B—OY2 groups present in the composition is equal to 5-80% of the number of epoxy groups present in the composition, and
when the equivalent ratio of active hydrogens in the curing agent(s) to the epoxy groups present in the composition is below 1.00:1.00, the number of B—OY2 groups present in the composition is equal to 5-80% of the number of active hydrogens in the curing agent(s), wherein the chemical installation is a chimney, pipe, or tank.

8. The chemical installation according to claim 7, wherein Y1 and Y2 are independently a C1-C8 alkyl or a C6-C8 aryl.

9. The chemical installation according to claim 7, wherein all of X1, X2, and X3 are independently —OY2.

* * * * *